United States Patent
Zhang et al.

(10) Patent No.: US 11,662,866 B2
(45) Date of Patent: May 30, 2023

(54) TOUCH PANEL AND POSITIONING METHOD THEREOF

(71) Applicants: Beijing BOE Display Technology Co., Ltd., Beijing (CN); BOE Technology Group Co., Ltd., Beijing (CN)

(72) Inventors: Lianghao Zhang, Beijing (CN); Wenchao Han, Beijing (CN); Yilin Feng, Beijing (CN); Xiaoyang Shen, Beijing (CN); Mingming Wang, Beijing (CN)

(73) Assignees: BEIJING BOE DISPLAY TECHNOLOGY CO., LTD., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 132 days.

(21) Appl. No.: 17/036,911

(22) Filed: Sep. 29, 2020

(65) Prior Publication Data

US 2021/0096695 A1 Apr. 1, 2021

(30) Foreign Application Priority Data

Sep. 30, 2019 (CN) .......................... 201910940884.1

(51) Int. Cl.
  *G06F 3/041* (2006.01)
  *G06F 3/044* (2006.01)
  *G02F 1/1333* (2006.01)

(52) U.S. Cl.
  CPC ........ *G06F 3/0446* (2019.05); *G02F 1/13338* (2013.01); *G06F 3/0445* (2019.05);
  (Continued)

(58) Field of Classification Search
  CPC .. G06F 3/0446; G06F 3/04186; G06F 3/0445; G06F 3/0448; G06F 2203/04104; G06F 3/041; G06F 3/044; G02F 1/13338
  See application file for complete search history.

(56) References Cited

U.S. PATENT DOCUMENTS

2007/0247443 A1* 10/2007 Philipp ................... G06F 3/044
                                                        345/173
2012/0007832 A1*  1/2012 Lee ....................... G06F 3/0446
                                                        178/18.05

(Continued)

*Primary Examiner* — Lunyi Lao
*Assistant Examiner* — Jarurat Suteerawongsa
(74) *Attorney, Agent, or Firm* — Nath, Goldberg & Meyer; Joshua B. Goldberg

(57) ABSTRACT

The present disclosure provides a touch panel and a positioning method thereof. The touch panel includes: a transparent conductive film layer including a plurality of first self-capacitance touch electrodes arranged along a first direction, wherein the plurality of first self-capacitance touch electrodes are configured to detect a coordinate of a touch point in the first direction, at least one of the plurality of first self-capacitance touch electrodes is a transparent conductive film block extending along a second direction, and the first direction intersects with the second direction; and a wire layer including a plurality of second self-capacitance touch electrodes arranged along the second direction, wherein the plurality of second self-capacitance touch electrodes are configured to detect a coordinate of the touch point in the second direction, and at least one of the plurality of second self-capacitance touch electrodes is a group of wires extending along the first direction.

13 Claims, 3 Drawing Sheets

(52) U.S. Cl.
CPC ........ *G06F 3/0448* (2019.05); *G06F 3/04186* (2019.05); *G06F 2203/04104* (2013.01)

(56) References Cited

U.S. PATENT DOCUMENTS

| | | | |
|---|---|---|---|
| 2014/0049508 A1* | 2/2014 | Kim .................. | G06F 3/0412 345/174 |
| 2016/0041666 A1* | 2/2016 | Lee .................. | G06F 3/0412 345/174 |
| 2016/0349869 A1* | 12/2016 | Chang ................ | G06F 3/0448 |
| 2019/0121180 A1* | 4/2019 | Ohashi ............... | G06F 3/0412 |

\* cited by examiner

TOUCH PANEL AND POSITIONING METHOD THEREOF

CROSS-REFERENCE TO RELATED APPLICATION

This application claims the priority of Chinese Patent Application No. 201910940884.1, filed on Sep. 30, 2019, the contents of which are incorporated herein in their entirety by reference.

TECHNICAL FIELD

The present disclosure relates to the field of semiconductor technology, and in particular, to a touch panel and a positioning method for the touch panel.

BACKGROUND

In recent years, touch devices have been widely used in many electronic devices such as mobile phones, computer display panels, touch screens, satellite navigation devices, digital cameras, etc. Examples of touch devices include a mutual-capacitance touch control device and a self-capacitance touch control device. In a mutual-capacitance touch control device, the touch electrodes include multiple touch scanning electrodes (Tx) and multiple touch sensing electrodes (Rx). In a self-capacitance touch control device, the touch electrode can achieve touch control function alone. When a finger touches a point on the touch control display panel, the capacitor of the finger superimposes on the touch panel capacitor, resulting in a change in the capacitance of the touch panel capacitor. Based on the capacitance change upon a touch event, the coordinates of the touch scanning electrode and the touch sensing electrode being touched may be determined.

SUMMARY

According to an aspect of the present disclosure, there is provided a touch panel including:

a transparent conductive film layer, including a plurality of first self-capacitance touch electrodes arranged along a first direction, wherein the plurality of first self-capacitance touch electrodes are configured to detect a coordinate of a touch point in the first direction, at least one of the plurality of first self-capacitance touch electrodes is a transparent conductive film block extending along a second direction, and the first direction intersects with the second direction; and a wire layer, including a plurality of second self-capacitance touch electrodes arranged along the second direction, wherein the plurality of second self-capacitance touch electrodes are configured to detect a coordinate of the touch point in the second direction, and at least one of the plurality of second self-capacitance touch electrodes is a group of wires extending along the first direction.

In an embodiment of the present disclosure, the first self-capacitance touch electrode includes a first transparent conductive film block and a second transparent conductive film block arranged along the first direction, the first transparent conductive film block includes a strip electrode extending along the second direction, the second transparent conductive film block includes at least two independent sub-electrodes, the at least two independent sub-electrodes are arranged together to form a shape of the strip electrode, and the first transparent conductive film block is configured to detect the coordinate of the touch point in the first direction, and the second transparent conductive film block is configured to determine a coordinate of the touch point in the second direction.

In an embodiment of the present disclosure, each of the plurality of first self-capacitance touch electrodes and the plurality of second self-capacitance touch electrodes is connected to a corresponding signal line.

In an embodiment of the present disclosure, the first transparent conductive film block includes a rectangular electrode extending along the second direction, and the second transparent conductive film block includes two independent right-angled triangular electrodes.

In an embodiment of the present disclosure, the first transparent conductive film block includes a rectangular electrode extending in the second direction, and the second transparent conductive film block includes two independent right-angled triangular electrodes and one independent isosceles triangular electrode.

In an embodiment of the present disclosure, the wire layer and gate lines of the touch panel are in a same layer, and wires in the wire layer and the gate lines extend in a same direction.

In an embodiment of the present disclosure, the touch panel further includes a liquid crystal display, the transparent conductive film layer is on the liquid crystal display, and the wire layer is on a side of the transparent conductive film layer distal to the liquid crystal display.

In an embodiment of the present disclosure, the transparent conductive film layer is formed of indium tin oxide.

In an embodiment of the present disclosure, the group of wires includes a plurality of metal wires connected together at both ends in the first direction.

According to another aspect of the present disclosure, there is provided a positioning method for a touch panel, wherein the touch panel is a touch panel according to the present disclosure, the method including:

detecting a coordinate of a touch point in the first direction by using the transparent conductive film layer; and detecting a coordinate of the touch point in the second direction by using the wire layer.

In an embodiment of the present disclosure, the first self-capacitance touch electrode includes a first transparent conductive film block and a second transparent conductive film block arranged along the first direction, the first transparent conductive film block includes a strip electrode extending along the second direction, the second transparent conductive film block includes at least two independent sub-electrodes, the at least two independent sub-electrodes are arranged together to form a shape of the strip electrode, detecting the coordinate of the touch point in the first direction by using the transparent conductive film layer includes detecting the coordinate of the touch point in the first direction by using the first transparent conductive film block, and the method further includes: determining a coordinate of each touch point in the second direction by using the second transparent conductive film block, in a case of multi-touch.

In an embodiment of the present disclosure, the first transparent conductive film block includes a rectangular electrode extending along the second direction, the second transparent conductive film block includes two independent right-angled triangular electrodes arranged to form a shape of the rectangular electrode, and the method includes:

in response to the touch panel sensing at least two touch points simultaneously, detecting at least four candidate positioning points by using the transparent conductive film layer and the wire layer;

determining a coordinate of each touch point in the second direction by using the second transparent conductive film block; and determining the at least two touch points from the at least four candidate positioning points according to the determined coordinate of each touch point in the second direction.

In an embodiment of the present disclosure, the second transparent conductive film block includes a right-angled triangle-shaped first sub-electrode and a right-angled triangle-shaped second sub-electrode, in a case where a touch point covers the first sub-electrode, a position of the touch point in the second direction is calculated by using formula (1):

$$y=(s/S) \times Y \qquad (1);$$

in a case where a touch point covers the second sub-electrode, a position of the touch point in the second direction is calculated by using formula (2):

$$y=Y-((s/S) \times Y) \qquad (2)$$

in a case where a touch point covers both the first sub-electrode and the second sub-electrode at the same time, weighted summation is performed on a coordinate calculated using formula (1) and a coordinate calculated using formula (2) to obtain a position of the touch point in the second direction;

wherein y is a position of an actual touch point in the second direction, Y is a total length of the first transparent conductive film block in the second direction, S is a signal variation generated when a bottom of a right-angled triangle-shaped sub-electrode is touched, and s is an actual signal variation generated by the actual touch point.

In an embodiment of the present disclosure, the first transparent conductive film block includes a rectangular electrode extending in the second direction, the second transparent conductive film block includes two independent right-angled triangular electrodes and one independent isosceles triangular electrode, the two independent right-angled triangular electrodes and the one independent isosceles triangular electrode are arranged to form a shape of the rectangular electrode, and the method includes:

in response to the touch panel sensing at least two touch points simultaneously, detecting at least four candidate positioning points by using the transparent conductive film layer and the wire layer;

determining a coordinate of each touch point in the second direction by using the second transparent conductive film block; and determining the at least two touch points from the at least four candidate positioning points according to the determined coordinate of each touch point in the second direction.

According to another aspect of the present disclosure, there is provided a display device including: a touch panel according to the present disclosure.

BRIEF DESCRIPTION OF THE DRAWINGS

In order to more clearly illustrate the embodiments of the present disclosure or technical solutions in the prior art, drawings used in the embodiments or the prior art will be briefly described below. It is obvious that the drawings in the following description are only for describing some embodiments of the present disclosure, and other drawings can be obtained by those skilled in the art without creative efforts.

DETAILED DESCRIPTION

To make objects, technical solutions and advantages of the present disclosure more apparent, the present disclosure will be described in further detail below with reference to specific embodiments and the accompanying drawings.

It should be noted that expressions of "first" and "second" used in the embodiments of the present disclosure are intended to distinguish two different entities or parameters with the same name. It can be seen that the expressions of "first" and "second" are merely for convenience of description and should not be construed as limiting the embodiments of the present disclosure, which will not be explained in the following embodiments.

Currently, in the self-capacitance and mutual-capacitance integrated touch technology, because an ITO (indium tin oxide) block corresponding to a touch sensing line (RX) (hereinafter, referred to as RX ITO block) and an ITO block corresponding to a touch driving line (TX) (hereinafter, referred to as TX ITO block) may generate different parasitic capacitances with gate lines, the TX ITO block and the RX ITO block are biased to different degrees. As a result, a cross stripe may occur in a picture displayed by a panel, and thus, the quality of the displayed picture is reduced.

Figure 1:
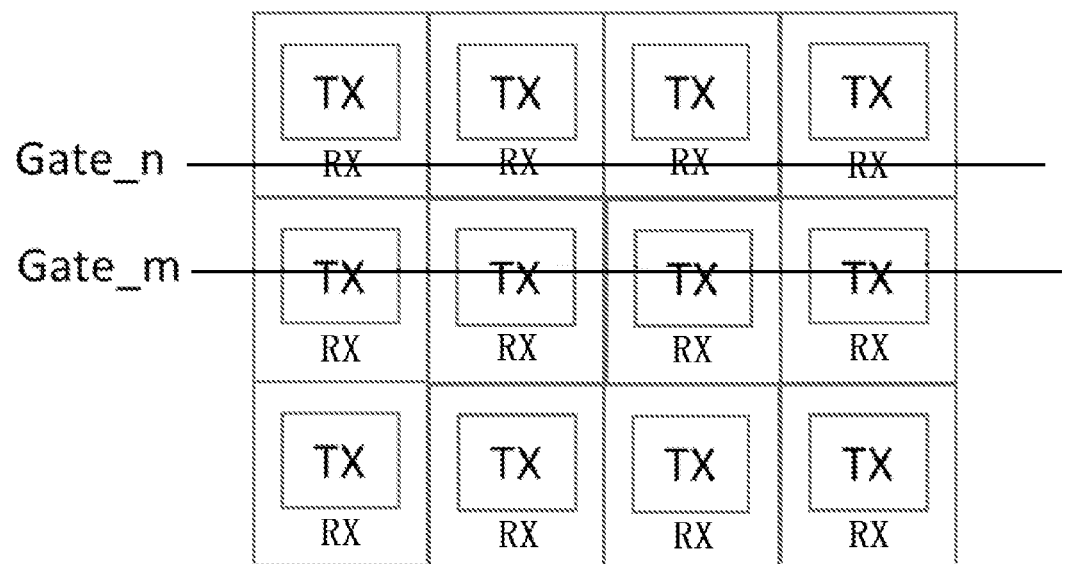
FIG. 1 is a schematic diagram illustrating a touch panel according to an exemplary embodiment.

FIG. 1 is a schematic diagram illustrating a touch panel according to an exemplary embodiment. As shown in FIG. 1, TX is a vertical ITO block, RX is a horizontal ITO block, and the vertical ITO block and the horizontal ITO block simultaneously realize self-capacitive touch control. A coordinate system is established through the RX ITO blocks and the TX ITO blocks, and a touch signal collected by the touch panel can be positioned. The gate line Gate-n in the n-th row, as a whole, corresponds in position to the RX ITO block. Assuming that a parasitic capacitance between the RX ITO block corresponding to one pixel and the gate line Gate-n is C1, and a resolution of the display panel is 3840×2160, the parasitic capacitance between the gate line Gate-n and the RX ITO block is 3840×3×C1. However, an overlapping area of the gate line (Gate-m) in the m-th row and the RX ITO block is small, and the parasitic capacitance between the gate line Gate-m and the RX ITO block is 2160×C1. The TX ITO block and the RX ITO block are biased to different degrees since the parasitic capacitance between the RX ITO block and the gate line and the parasitic capacitance between the TX ITO block and the gate line are different, thereby generating a cross stripe. Since impedances of the RX ITO block and the TX ITO block are not the same, the cross stripes occur in both cases of a flicker pattern and an overload pattern. In addition, since an effective mutual capacitance value is too small (the mutual capacitance value depends on a circumference of the TX ITO block and the number of effective electric field lines), the mutual capacitance function cannot be realized.

In the case of the flicker pattern, because the overlapping area of a row of pixels with the RX ITO block and the overlapping area of a row of pixels with the TX ITO block are not the same, the RX ITO block and the TX ITO block are not uniformly biased by potential variations at the pixels when the pixels are charged, resulting in non-uniform brightness display between the position of the RX ITO block and the position of the TX ITO block, and thus generating the cross stripes. In the case of the overload pattern, because the signal line (source line) is changed between 0 gray level and 255-th gray level during charging of each row, voltages of the RX ITO block and the TX ITO block are pulled. However, because the impedances of the two ITO blocks are not the same, the two ITO blocks are biased to different degrees by the source line, and thus, the cross stripes occur.

Figure 2:
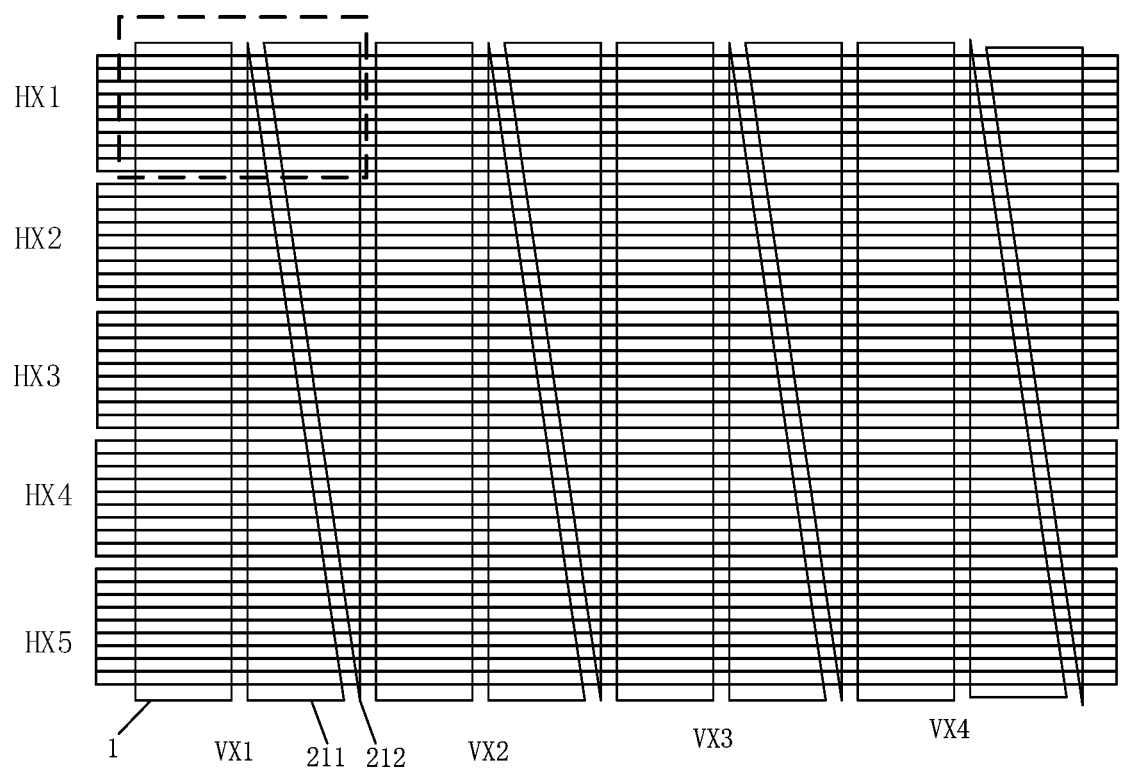
FIG. 2 is a schematic diagram illustrating a portion of a touch panel according to an exemplary embodiment.

FIG. 2 is a schematic diagram illustrating a portion of a touch panel according to an exemplary embodiment. As shown in FIG. 2, the touch panel includes:

a transparent conductive film layer, including a plurality of first self-capacitance touch electrodes which are arranged along a first direction, the plurality of first self-capacitance touch electrodes being configured to detect a coordinate of a touch point in the first direction, at least one first self-capacitance touch electrode being a transparent conductive film block which extends along a second direction, and the first direction intersecting with the second direction; and a wire layer, including a plurality of second self-capacitance touch electrodes arranged along the second direction, the plurality of second self-capacitance touch electrodes being configured to detect a coordinate of the touch point in the second direction, and at least one second self-capacitance touch electrode being a group of wires extending along the first direction.

For example, the plurality of first self-capacitance touch electrodes may include the transparent conductive film blocks VX1-VX4 shown in FIG. 2, and the plurality of second self-capacitance touch electrodes may include a group of wires HX1-HX5 shown in FIG. 2. In some embodiments, the first direction and the second direction are perpendicular to each other. The first self-capacitance touch electrode and the second self-capacitance touch electrode of the transparent conductive film layer may be ITO films, for example. One transparent conductive film block may be, for example, a rectangular ITO block or a right-angled triangular ITO block as shown in FIG. 2. The VX ITO block of one channel has a width of 48 pixels, e.g., a rectangular ITO block has a width of 24 pixels and a right-angled triangular ITO block also has a width of 24 pixels. A length of the ITO block may be determined according to the width of the display panel. For a UHD (Ultra High Definition) panel, the ITO block may have a length of 2160 pixels. In the present disclosure, a rectangular ITO block and a pair of right-angled triangular ITO blocks adjacent thereto may be referred to as a VX block (corresponding to one first self-capacitance touch electrode), and the VX block is a self-capacitance electrode extending vertically in the touch panel. Four VX blocks VX1-VX4 are shown in FIG. 2. In addition, one group of wires may include a plurality of metal wires with ends connected, for example, one group of wires is an HX block (corresponding to one second self-capacitance touch electrode), and the HX block is a self-capacitance electrode extending horizontally in the touch panel. Five HX blocks HX1-HX5 are shown in FIG. 2. The first direction may be, for example, a horizontal direction of the touch panel, and the second direction may be, for example, a vertical direction of the touch panel.

In an embodiment of the present disclosure, spatially overlapped portions of the first self-capacitance touch electrode and the second self-capacitance touch electrode form a touch unit. For example, a portion of the transparent conductive film block and a portion of the group of wires in the region indicated by the dashed box in FIG. 2 constitute one touch unit.

The touch panel according to the embodiment of the present disclosure includes a wire layer and a transparent conductive film layer. Because the touch panel is only provided with the transparent conductive film block extending along the second direction and is not provided with the transparent conductive film block extending along the first direction, the influence of the signal lines or the rows of pixels on the transparent conductive film block is consistent, and the case that the transparent conductive film blocks are biased to different degrees will not occur in both cases of the flicker pattern and the overload pattern. Therefore, no cross stripes appear in the displayed picture, and the display performance of the panel is improved.

In an embodiment of the present disclosure, each of the first self-capacitance touch electrodes and each of the second self-capacitance touch electrodes are respectively connected to corresponding signal lines. By taking the touch panel shown in FIG. 2 as an example, the rectangular ITO block and the right-angled triangular ITO block included in each ITO block are respectively connected to the corresponding signal lines. In addition, each group of wires is connected to the corresponding signal line. Because the touch panel according to the embodiment of the present disclosure only has the vertically extending ITO blocks and does not have the horizontally extending ITO blocks, the number of signal lines is reduced, thereby avoiding the problem that a size of the frame of the touch panel is too large due to a too large size of an integrated circuit of the touch panel.

Figure 3:
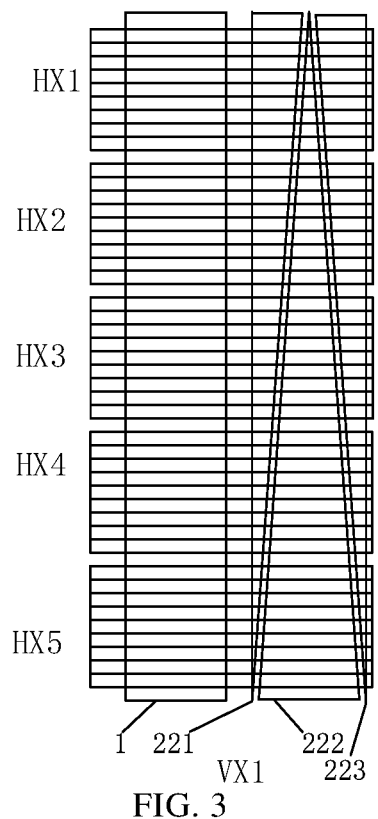
FIG. 3 is a schematic diagram illustrating a transparent conductive film block group according to an exemplary embodiment.

In an embodiment of the present disclosure, the first self-capacitance touch electrode VX includes a first transparent conductive film block and a second transparent conductive film block arranged along the first direction, the first transparent conductive film block includes a strip electrode extending along the second direction, the second transparent conductive film block includes at least two independent sub-electrodes, and the at least two independent sub-electrodes are arranged together to form a shape of the strip electrode. The first transparent conductive film block is configured to detect a coordinate of a touch point in the first direction, and the second transparent conductive film block is configured to determine a coordinate of the touch point in the second direction. A first transparent conductive film block and a second transparent conductive film block may be regarded as a transparent conductive film block group. For example, as shown in FIG. 2, the touch panel includes four transparent conductive film block groups VX1-VX4, and one transparent conductive film block group may include a pair of right-angled triangular transparent conductive film blocks 211 and 212 and one rectangular transparent conductive film block 1 adjacent to the pair. The two right-angled triangular transparent conductive film blocks 211 and 212 form the shape of the rectangular transparent conductive film block. FIG. 3 is a schematic diagram of another transparent conductive film block group. As shown in FIG. 3, the transparent conductive film block group may further include one rectangular transparent conductive film block 1, one isosceles triangular transparent conductive film block 221, and two right-angled triangular transparent conductive film blocks 222 and 223, which are adjacent to each other. In the transparent conductive film block groups shown in FIGS. 2 and 3, the rectangular transparent conductive film block may be used to determine the position of a touch point in the X-axis direction (i.e., one example of the first direction) of the touch panel, and the triangular transparent conductive film block (including a right-angled triangular transparent conductive film block and an isosceles triangular transparent conductive film block) may be used to determine the position of a touch point in the Y-axis direction (i.e., one example of the second direction) of the touch panel. Because the transparent conductive film blocks with different shapes are arranged in one transparent conductive film block group, the positions of the touch point in the X-axis direction and the Y-axis direction can be respectively determined according to the two transparent conductive film blocks with different shapes in one transparent conductive film block group, so that ghost points can be eliminated in the case of multi-finger touch, and thus, the positioning accuracy of the touch points on the touch panel is improved.

In an embodiment of the present disclosure, the first transparent conductive film block may include a rectangular electrode extending along the second direction, and the second transparent conductive film block includes two independent right-angled triangular electrodes. For example, the transparent conductive film layer may include n pairs of first and second transparent conductive film blocks according to the size of the touch panel. Thus, the position of the detected touch signal in the X-axis direction of the touch panel is determined by means of the first transparent conductive film block, and the position of the detected touch signal in the Y-axis direction of the touch panel is determined by means of the second transparent conductive film block.

Figure 4:
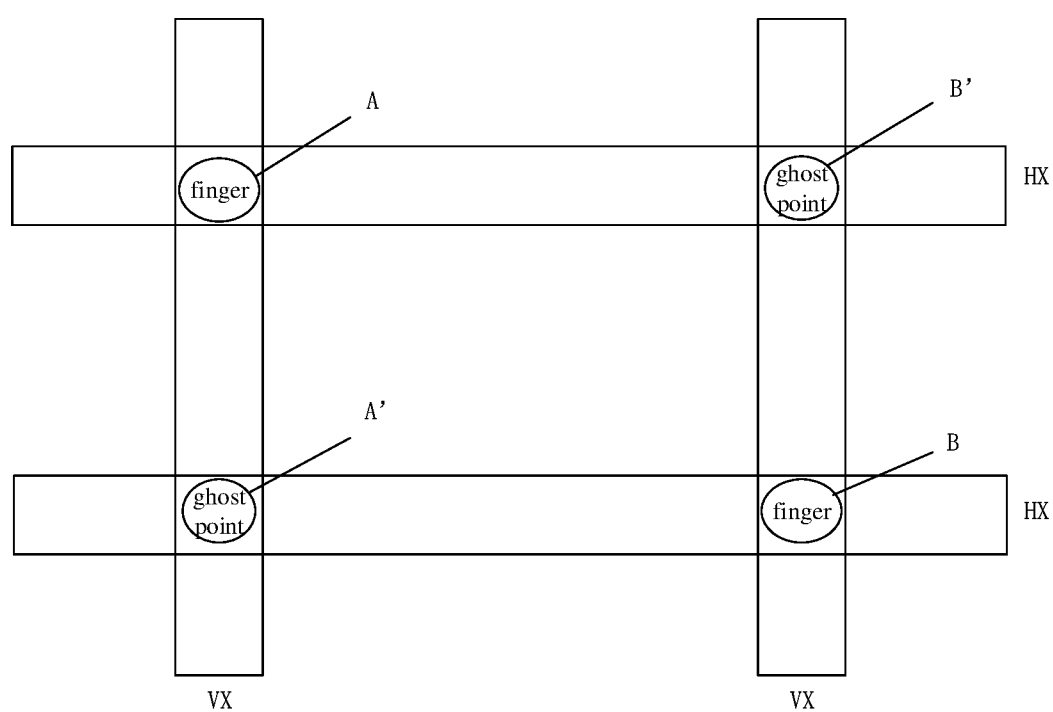
FIG. 4 is a schematic diagram illustrating ghost points generated when a multi-finger touch is performed on a touch panel according to an exemplary embodiment.

FIG. 4 shows a case where simultaneous multiple touches on the touch panel causes ghost points. As shown in FIG. 4, when a user performs touch operations on points A and B of the touch panel with a finger at the same time, points A' and B' may be identified as touch points, and in this case, points A' and B' are ghost points.

Figure 5:
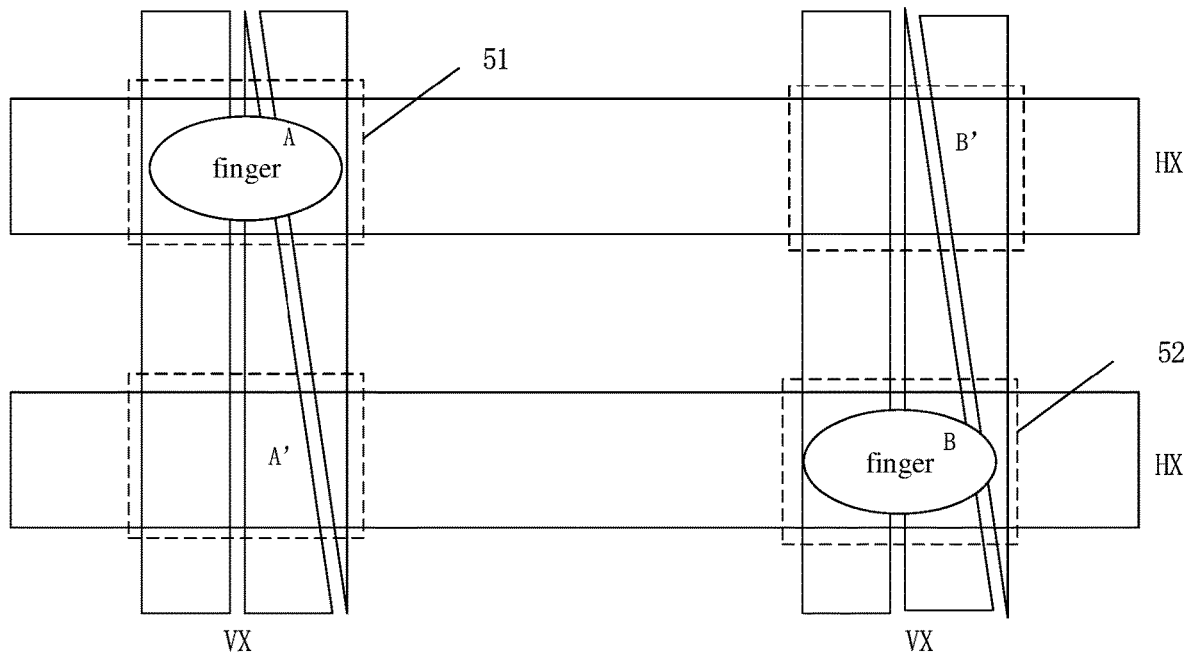
FIG. 5 is a schematic diagram illustrating that a touch panel positions touch points in a multi-touch case according to an exemplary embodiment.

In an embodiment of the present disclosure, the first transparent conductive film block is used to determine a position of a touch signal received by the touch panel in the first direction, and the second transparent conductive film block is used to determine a position of a touch signal received by the touch panel in the second direction. By taking the touch panel shown in FIG. 2 as an example, for any right-angled triangular electrode in a transparent conductive film block group, a position of the touch point in the vertical direction may be calculated according to formula (1): y=(s/S)×Y. In the formula, y is the position of the actual touch point in the vertical direction of the touch panel, Y is the longitudinal length of the second self-capacitance touch electrode, S is the signal variation generated when a touch object touches a bottom of the right-angled triangular ITO block, and s is the actual signal variation generated at the actual touch point. For the other right-angled triangular electrode in the transparent conductive film block group, the position of the touch point in the vertical direction of the touch panel may be calculated according to formula (2): y=Y−((s/S)×Y). By taking the touch panel shown in FIG. 2 as an example, and assuming that the present touch panel receives a touch signal, and a touch point covers one right-angled triangular electrode in one transparent conductive film block group (when the touch point covers one right-angled triangular electrode, a signal line corresponding to the electrode reports a signal variation, and similarly, when the touch point covers two right-angled triangular electrodes, signal lines corresponding to the two right-angled triangular electrodes both report signal variations), the generated signal variation is substituted into the above formula (1) or formula (2) according to the right-angled triangular electrode generating a capacitance variation, to obtain the position of the touch point in the vertical direction of the touch panel. Assuming that a touch signal is received by the present touch panel and a touch point covers two right-angled triangular electrodes in one transparent conductive film block group, the two right-angled triangular electrodes generate a signal variation s1 and a signal variation s2 respectively, and the two signal variations may be respectively substituted into the above formula (1) and formula (2), to obtain two coordinate values y1 and y2. Since the coordinate x1 of the touch point in the X-axis direction has been previously determined, weight values corresponding to the coordinate values y1 and y2 may be determined according to the distance between the coordinate x1 and the two right-angled triangular electrodes. For example, the weight value may be negatively correlated with the distance value, i.e., the weight value corresponding to the right-angled triangular electrode farther away from the coordinate x1 is smaller. Assuming that it is determined that the weight value corresponding to the coordinate y1 is 0.4 and that the weight value corresponding to the coordinate y2 is 0.6, the actual coordinate of the touch point on the Y-axis is y3=y1×0.4+y2×0.6. FIG. 5 illustrates a case that a touch panel positions touch points in a multi-touch case according to an embodiment of the present disclosure. As shown in FIG. 5, a transparent conductive film block group VX is composed of a rectangular ITO block and a pair of independent right-angled triangular ITO blocks adjacent to the rectangular ITO block. After the user simultaneously touches point A at the touch unit 51 and point B at the touch unit 52 with fingers, the capacitance changes at the touch unit 51 and the touch unit 52 may be determined through the transparent conductive film layer and the wire layer, so as to determine the coordinates x4 and x5 of the touch points in the horizontal direction of the touch panel according to the rectangular ITO blocks in the touch unit 51 and the touch unit 52, and preliminarily obtain four positioning points, namely, point A (x4, y4), point B (x5, y5), point A' (x4, y4') and point B' (x5, y5'). Assuming that the vertical coordinate y4 of the touch point A is determined in the above manner, the actual coordinates of the touch point A are determined to be (x4, y4), and thus point A' may be determined to be a ghost point. The vertical coordinate y5 of point B is determined in the same manner, and point B' may be determined to be a ghost point. The accurate positioning of the touch points can be realized by eliminating the ghost points. Based on this, the touch panel according to the embodiment of the present disclosure can not only accurately position the touch points under the self-capacitance condition, but also effectively eliminate the ghost points generated under the multi-finger touch condition.

The touch panel according to the embodiment of the present disclosure may be a self-capacitance touch panel. Based on this, the respective transparent conductive film blocks and the respective groups of wires are connected to respective self-capacitance signal lines. Each transparent conductive film block is a self-capacitance electrode block.

In an embodiment of the present disclosure, the wire layer and gate lines of the touch panel are located in a same layer.

In an embodiment of the present disclosure, the touch panel may further include a liquid crystal display, the transparent conductive film layer is located on the liquid crystal display, and the wire layer is located on a side of the transparent conductive film layer distal to the liquid crystal display. By taking the touch panel shown in FIG. 2 as an example, the wire layer is located on a side of the ITO film layer close to the user, so that the problem of cross stripes of the touch panel can be effectively avoided.

Figure 6:
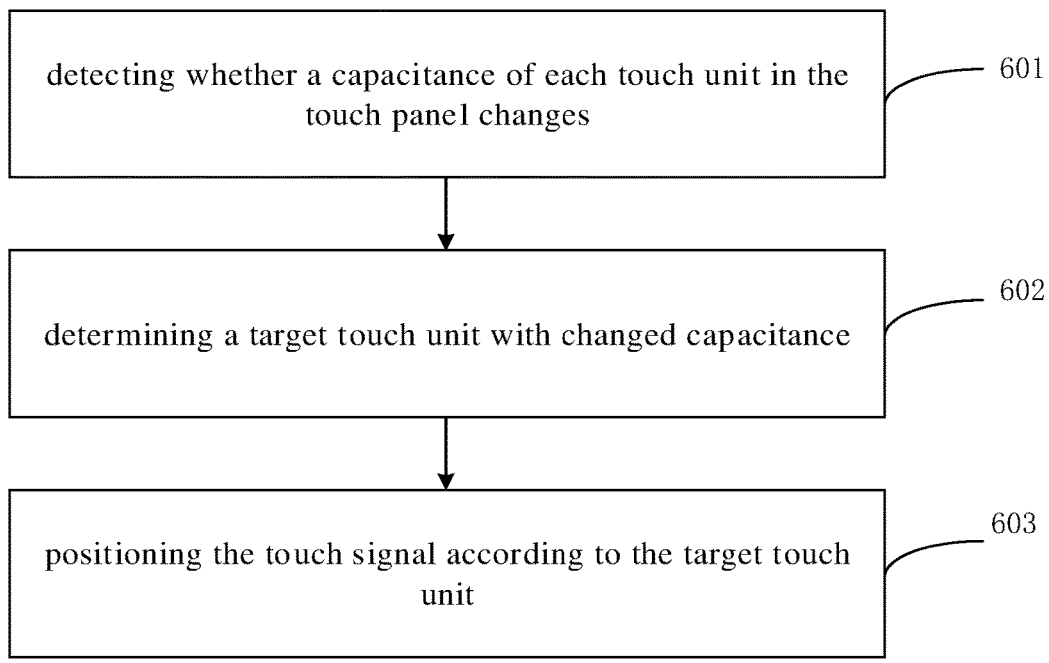
FIG. 6 is a flowchart illustrating a positioning method for a touch panel according to an exemplary embodiment.

FIG. 6 is a flowchart illustrating a positioning method for a touch panel according to an exemplary embodiment. The method may be used for positioning a touch signal received by any one of the above touch panels. As shown in FIG. 6, the method includes:

step 601: detecting whether a capacitance of each touch unit in the touch panel changes;

step 602: determining a target touch unit with changed capacitance; and step 603: positioning the touch signal according to the target touch unit.

In the positioning method for the touch panel in the embodiment of the present disclosure, the vertical position and the horizontal position of the touch signal on the touch panel are determined by the transparent conductive film blocks with different shapes in the touch panel, so that ghost points can be effectively eliminated, and the positioning accuracy of the touch signal is improved.

In an embodiment of the present disclosure, a coordinate of a touch point in a first direction is detected using a transparent conductive film layer; and a coordinate of the touch point in the second direction is detected using the wire layer. The transparent conductive film layer includes a plurality of first self-capacitance touch electrodes arranged along the first direction, at least one first self-capacitance touch electrode is a transparent conductive film block extending along the second direction, and the first direction intersects with the second direction. The wire layer includes a plurality of second self-capacitance touch electrodes arranged along the second direction, and at least one second self-capacitance touch electrode is a group of wires extending along the first direction.

In an embodiment of the present disclosure, the first self-capacitance touch electrode includes a first transparent conductive film block and a second transparent conductive film block arranged along the first direction, the first transparent conductive film block includes a rectangular electrode extending along the second direction, the second transparent conductive film block includes two independent right-angled triangular electrodes, and the two independent right-angled triangular electrodes are arranged to form a shape of the rectangular electrode. Based on this, the positioning method includes: in response to the touch panel sensing at least two touch points simultaneously, detecting at least four candidate positioning points by using the transparent conductive film layer and the wire layer; determining a coordinate of each touch point in the second direction by using the second transparent conductive film block; and determining at least two actual touch points from the at least four positioning points according to the determined coordinate of each touch point in the second direction. By taking FIG. 5 as an example, when it is determined that the capacitances to the ground of the transparent conductive film block (which is a self-capacitance sensing block) and the group of wires at the target touch unit 51 and the target touch unit 52 in the touch panel change, four positioning points, i.e., point A, point B, point A', and point B', are determined according to the rectangular ITO block and the group of wires at the target touch units. The positions of the actual touch point A and the actual touch point B in the vertical direction of the touch panel are determined by using the right-angled triangular ITO blocks at the target touch unit 51 and the target touch unit 52, and after the positions of the actual touch point A and the actual touch point B in the vertical direction of the touch panel are determined, the positions of the actual touch point A and the actual touch point B can be obtained by excluding point A' and point B' from the above four positioning points.

In some embodiments, the second transparent conductive film block includes a right-angled triangle-shaped first sub-electrode and a right-angled triangle-shaped second sub-electrode. When a touch point covers the first sub-electrode, the position of the touch point in the second direction is calculated using the following formula (1):

$$y=(s/S) \times Y \qquad (1);$$

When a touch point covers the second sub-electrode, the position of the touch point in the second direction is calculated using the following formula (2):

$$y=Y-((s/S) \times Y) \qquad (2)$$

When the touch point covers both the first sub-electrode and the second sub-electrode at the same time, weighted summation is performed on the coordinate calculated using formula (1) and the coordinate calculated using formula (2), to obtain the position of the touch point in the second direction. The way to determine the position of the touch point in the second direction has been described in detail above, and is not described in detail here.

In an embodiment of the present disclosure, the first transparent conductive film block includes a rectangular electrode extending along the second direction, the second transparent conductive film block includes two independent right-angled triangular electrodes and one independent isosceles triangular electrode, and the two independent right-angled triangular electrodes and the one independent isosceles triangular electrode are arranged to form the shape of the rectangular electrode. Based on this, the positioning method includes: in response to the touch panel sensing at least two touch points simultaneously, detecting at least four candidate positioning points by using the transparent conductive film layer and the wire layer; determining a coordinate of each touch point in the second direction by using the second transparent conductive film block; and determining the at least two touch points from the at least four candidate positioning points according to the determined coordinate of each touch point in the second direction.

The embodiments of the present disclosure further provide a display device, which includes any one of the above touch panels.

Those of ordinary skill in the art will understand that: the discussion of any embodiment above is meant to be exemplary only, and is not intended to imply that the scope of the present disclosure, including the claims, is limited to these examples; within the idea of the present disclosure, the above embodiments or technical features in different embodiments may be combined, steps may be implemented in any order, and there are many other variations of different aspects of the present disclosure as described above, which are not provided in detail for the sake of brevity.

In addition, well known power/ground connections to integrated circuit (IC) chips and other components may or may not be shown in the provided drawings for simplicity of illustration and discussion, and not obscuring the present disclosure. Further, devices may be shown in the form of blocks, in order to avoid obscuring the present disclosure, and also in view of the fact that specifics with respect to implementation of these block devices are highly dependent upon the platform within which the present disclosure is to be implemented (i.e., specifics should be well within purview of one skilled in the art). Where specific details (e.g., circuits) are set forth in order to describe example embodiments of the present disclosure, it should be apparent to one skilled in the art that the present disclosure may be practiced without, or with variation of, these specific details. Accordingly, the description is to be regarded as illustrative instead of restrictive.

While the present disclosure has been described in conjunction with specific embodiments thereof, many alternatives, modifications, and variations thereof will be apparent to those skilled in the art in light of the foregoing description. For example, other memory architectures (e.g., dynamic RAM (DRAM)) may use the embodiments discussed.

The embodiments of the present disclosure are intended to encompass all such alternatives, modifications and variances that fall within the broad scope of the appended claims. Therefore, any omissions, modifications, equivalents, improvements, and the like that may be made without departing from the spirit or scope of the present disclosure are intended to be included within the scope of the present disclosure.

The invention claimed is:

1. A touch panel, comprising:
a transparent conductive film layer, comprising a plurality of first self-capacitance touch electrodes arranged along a first direction, wherein the plurality of first self-capacitance touch electrodes are configured to detect a coordinate of a touch point in the first direction, at least one of the plurality of first self-capacitance touch electrodes is a transparent conductive film block extending along a second direction, and the first direction intersects with the second direction; and
a wire layer, comprising a plurality of second self-capacitance touch electrodes arranged along the second direction, wherein the plurality of second self-capacitance touch electrodes are configured to detect a coordinate of the touch point in the second direction, at least one of the plurality of second self-capacitance touch electrodes is a group of wires extending along the first direction, and the group of wires comprises a plurality of metal wires connected together at two ends of the plurality of metal wires in the first direction,
wherein the first self-capacitance touch electrode comprises a first transparent conductive film block and a second transparent conductive film block arranged along the first direction, the first transparent conductive film block is one strip electrode extending along the second direction, the second transparent conductive film block comprises at least two independent sub-electrodes, the at least two independent sub-electrodes are arranged together to form a shape of the one strip electrode,
the first transparent conductive film block is configured to detect the coordinate of the touch point in only the first direction, and the second transparent conductive film block is configured to determine a coordinate of the touch point in the second direction, and
the touch panel is not provided with the transparent conductive film block extending along the first direction.

2. The touch panel of claim 1, wherein each of the plurality of first self-capacitance touch electrodes and the plurality of second self-capacitance touch electrodes is connected to a corresponding signal line.

3. The touch panel of claim 1, wherein the first transparent conductive film block comprises a rectangular electrode extending along the second direction, and the second transparent conductive film block comprises two independent right-angled triangular electrodes.

4. The touch panel of claim 1, wherein the first transparent conductive film block comprises a rectangular electrode extending in the second direction, and the second transparent conductive film block comprises two independent right-angled triangular electrodes and one independent isosceles triangular electrode.

5. The touch panel of claim 1, wherein the wire layer and gate lines of the touch panel are in a same layer, and wires in the wire layer and the gate lines extend in a same direction.

6. The touch panel of claim 1, wherein the touch panel further comprises a liquid crystal display, the transparent conductive film layer is on the liquid crystal display, and the wire layer is on a side of the transparent conductive film layer distal to the liquid crystal display.

7. The touch panel of claim 1, wherein the transparent conductive film layer is formed of indium tin oxide.

8. A positioning method for a touch panel, wherein the touch panel is a touch panel of claim 1, and the method comprises:
detecting a coordinate of a touch point in the first direction by using the transparent conductive film layer; and
detecting a coordinate of the touch point in the second direction by using the wire layer.

9. The positioning method of claim 8, wherein
detecting the coordinate of the touch point in the first direction by using the transparent conductive film layer comprises detecting the coordinate of the touch point in the first direction by using the first transparent conductive film block, and
the method further comprises: determining a coordinate of each touch point in the second direction by using the second transparent conductive film block, in a case of multi-touch.

10. The positioning method of claim 9, wherein the first transparent conductive film block comprises a rectangular electrode extending along the second direction, the second transparent conductive film block comprises two independent right-angled triangular electrodes arranged to form a shape of the rectangular electrode, and the method comprises:
in response to the touch panel sensing at least two touch points simultaneously, detecting at least four candidate positioning points by using the transparent conductive film layer and the wire layer;
determining a coordinate of each touch point in the second direction by using the second transparent conductive film block; and
determining the at least two touch points from the at least four candidate positioning points according to the determined coordinate of each touch point in the second direction.

11. The positioning method of claim 10, wherein the second transparent conductive film block comprises a right-angled triangle-shaped first sub-electrode and a right-angled triangle-shaped second sub-electrode,
in a case where a touch point covers the first sub-electrode, a position of the touch point in the second direction is calculated by using formula (1):

$$y=(s/S)\times Y \qquad (1)$$

in a case where a touch point covers the second sub-electrode, a position of the touch point in the second direction is calculated by using formula (2):

$$y=Y-((s/S)\times Y) \qquad (2)$$

in a case where a touch point covers both the first sub-electrode and the second sub-electrode at the same time, weighted summation is performed on a coordinate calculated using formula (1) and a coordinate calculated using formula (2), to obtain a position of the touch point in the second direction;

wherein y is a position of an actual touch point in the second direction, Y is a total length of the first transparent conductive film block in the second direction, S is a signal variation generated when a bottom of a right-angled triangle-shaped sub-electrode is touched, and s is an actual signal variation generated by the actual touch point.

12. The positioning method of claim 8, wherein the first transparent conductive film block comprises a rectangular electrode extending in the second direction, the second transparent conductive film block comprises two independent right-angled triangular electrodes and one independent isosceles triangular electrode, the two independent right-angled triangular electrodes and the one independent isosceles triangular electrode are arranged to form a shape of the rectangular electrode, and the method comprises:

in response to the touch panel sensing at least two touch points simultaneously, detecting at least four candidate positioning points by using the transparent conductive film layer and the wire layer;

determining a coordinate of each touch point in the second direction by using the second transparent conductive film block; and determining the at least two touch points from the at least four candidate positioning points according to the determined coordinate of each touch point in the second direction.

13. A display device, comprising:
the touch panel of claim 1.

\* \* \* \* \*